United States Patent Office 3,192,016

Patented June 29, 1965

1

2

3,192,016

XENON HEXAFLUORIDE AND METHOD OF MAKING

John G. Malm, Naperville, Irving Sheft, Oak Park, Howard H. Claassen, Wheaton, and Cedric L. Chernick, River Forest, Ill., assignors to the United States of America as represented by the United States Atomic Energy Commission No Drawing. Filed Dec. 18, 1962, Ser. No. 245,951
7 Claims. (Cl. 23—205)

This invention deals with xenon hexafluoride, a method of making this novel compound, and it also deals with fluorination processes using xenon hexafluoride.

It has been found that a mixture containing xenon and an excess of fluorine over the amount required for the production of xenon hexafluoride, when heated in a hermetically sealed container, reacts to form xenon hexafluoride. The invention is based on this finding.

One embodiment of this invention thus is a process that comprises heating a mixture of xenon gas and at least 10 moles of fluorine gas per one mole of xenon in a closed system whereby pressure builds up and the xenon reacts with the fluorine, forming xenon hexafluoride; and cooling the xenon hexafluoride formed for solidification.

The xenon hexafluoride has been produced using total pressures ranging from 10 to 50 atmospheres at reaction temperature, the higher pressures within this range giving the higher yields. From 10 to 40 moles of fluorine gas per one mole of xenon has given satisfactory results, a ratio of from 15 to 20 moles being preferred. The reaction times have varied from one hour to 17 hours. The temperature may range from 200 to 400° C., about 300° C. being the preferred condition. The higher temperatures within the specified range bring about a faster reaction. In all experiments that were carried out for the purpose of this invention, the yield of xenon hexafluoride was above 90% as to the amount of xenon used.

Xenon hexafluoride is a colorless solid that is stable at room temperature. It has a vapor pressure of 7.5 mm. Hg at 0° C. and of 30 mm. Hg at 25° C.; the vapor is pale yellow. Xenon hexafluoride, when slowly heated, turns yellow at about 42° C. and melts at 46° C., forming a yellow liquid. When this liquid is resolidified, the yellow color disappears. Xenon hexafluoride vapor attacks glass and thereby reacts to form a colorless liquid; the xenon compound formed thereby has not yet been identified.

Xenon hexafluoride is very soluble in anhydrous hydrogen fluoride and to a greater degree than is xenon tetrafluoride; this dissolution takes place without a reaction. Four grams only of xenon tetrafluoride are soluble in 100 grams of anhydrous hydrogen fluoride at 25° C.; xenon hexafluoride is soluble in an amount of above 70 grams per 100 grams of anhydrous hydrogen fluoride at the same temperature. Xenon hexafluoride reacts violently at room temperature with hydrogen and with water. Xenon hexafluoride can be used as a fluorinating agent for inorganic as well as organic compounds; it fluorinates many materials at room temperature that do not react with elemental fluorine under the same conditions.

The reactivity of xenon hexafluoride at room temperature is obvious from the following observation: An apparatus was used for the storage, at room temperature, of 200 mg. of xenon hexafluoride; the apparatus had been used before for the processing of uranium compounds, and its pipe lines contained some lower uranium fluorides. After the xenon hexafluoride had been stored in the apparatus for about an hour, all uranium had disappeared from the pipe lines. It had been converted to the volatile uranium hexafluoride by the xenon hexafluoride.

In the following, an example is given to illustrate the process of producing xenon hexafluoride.

*Example*

5.25 millimoles of xenon and 110 millimoles of fluorine gas were introduced into and sealed in an 87-cc. nickel container. The gas mixture was heated in this container at about 300° C. for 16 hours, whereby a pressure of about 60 atmospheres built up. After this heating period, the nickel container was cooled to room temperature, immersed in a bath of Dry Ice (—78° C.), and the excess fluorine gas was pumped off; finally the product was sublimed into Dry Ice for the purpose of purification. The quantity of xenon hexafluoride was determined and found to represent a yield of about 92%.

In order to ascertain the formula of the colorless compound formed in the above example, a weighted fraction of it was introduced into a container and an excess amount of hydrogen was added thereto. The container was closed and heated to about 400° C. whereby the xenon compound formed decomposed and free xenon gas and hydrogen fluoride were formed. The container was then immersed in liquid nitrogen, and the excess hydrogen was pumped off.

The container was slowly warmed to room temperature, and the remaining gas mixture was pumped through two U-tubes. The first U-tube was cooled by a bath of isopentane held at its melting point (—159° C.), and the hydrogen fluoride was condensed in this trap. The second U-tube was cooled by liquid nitrogen, and the xenon was condensed therein. The hydrogen fluoride was weighed and hydrolyzed in a known quantity of sodium hydroxide solution and determined both by back-titration and fluoride analysis of the solution. The condensed xenon was also weighed and then checked for purity with a mass spectrometer. The data will be given below.

Samples of xenon hexafluoride obtained from two separate runs were thus analyzed, one using 0.3934 gram and the other one 0.2256 gram of xenon hexafluoride. The respective xenon contents were determined as 0.2125 gram and 0.1195 gram, while the corresponding fluorine contents were found to be 0.1770 gram and 0.0996 gram. These represent atom ratios for F:Xe of 5.79 and 5.76, respectively. The xenon was found to be of a 100-percent purity.

The formula of the samples was confirmed radiochemically using $Xe^{133}$ and $F^{18}$ as tracers. The ratio of 6 for F:Xe was confirmed by this.

It will be understood that the invention is not to be limited to the details given herein but that it may be modified within the scope of the appended claims.

What is claimed is:

1. A process of preparing xenon hexafluoride, comprising heating xenon gas and at least 10 moles of fluorine gas per one mole of xenon in a closed system to between 200 and 400° C., whereby pressure builds up and the xenon reacts with the fluorine, forming xenon hexafluoride; and cooling the xenon hexafluoride formed to room temperature for solidification.

2. The process of claim 1 wherein 10 to 40 moles of fluorine are used per one mole of xenon and a pressure of from 10 to 50 atmospheres is maintained.

3. The process of claim 2 wherein from 15 to 20 moles of fluorine are used per mole of xenon.

4. The process of claim 1 wherein the mixture is heated to a temperature of about 300° C.

5. As a new composition of matter, xenon hexafluoride, $XeFe_6$.

6. A new fluorinating agent consisting of hexafluoride.

7. A method of converting uranium fluorides lower than the hexafluoride to the hexafluoride comprising the step of contacting said lower fluorides with xenon hexafluoride at room temperature.

References Cited by the Examiner

Chemical Society Proceedings, June 1962, page 218.

Cook, "Argon, Helium and the Rare Gases," page 159, vol. I, copyrighted October 5, 1961.

Mellor, "Comprehensive Treatise on Inorganic and Theoretical Chemistry," Supp. II, part 1 (1956), page 65.

MAURICE A. BRINDISI, *Primary Examiner.*